United States Patent
Grosch et al.

(10) Patent No.: US 12,113,251 B2
(45) Date of Patent: Oct. 8, 2024

(54) FUEL CELL SYSTEM

(71) Applicant: FORD GLOBAL TECHNOLOGIES, LLC, Dearborn, MI (US)

(72) Inventors: Hans Guenter Grosch, Vettweiss (DE); Rainer Kiehn, Frechen (DE); Krystian Dylong, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 17/476,710

(22) Filed: Sep. 16, 2021

(65) Prior Publication Data
US 2022/0102741 A1    Mar. 31, 2022

(30) Foreign Application Priority Data

Sep. 28, 2020 (DE) .......................... 102020212158.3

(51) Int. Cl.
*H01M 8/04111* (2016.01)
*H01M 8/04014* (2016.01)
(Continued)

(52) U.S. Cl.
CPC .... *H01M 8/04111* (2013.01); *H01M 8/04014* (2013.01); *H01M 8/04126* (2013.01);
(Continued)

(58) Field of Classification Search
CPC ......... H01M 8/04111; H01M 8/04014; H01M 8/04126; H01M 8/04716; H01M 8/0488;
(Continued)

(56) References Cited

U.S. PATENT DOCUMENTS 5,503,944 A * 4/1996 Meyer ................ H01M 8/04119
                                                   429/437
2002/0146606 A1 * 10/2002 Kobayashi ........ H01M 8/04268
                                                   429/436
(Continued)

FOREIGN PATENT DOCUMENTS

CA        2595091      *   8/2006
DE    102010006020 A1      9/2011
(Continued)

OTHER PUBLICATIONS

German Examination Report DE 10 2020 212 158.3 Filed Jun. 24, 2021, 6 pages.

*Primary Examiner* — Matthew W Van Oudenaren
(74) *Attorney, Agent, or Firm* — Brooks Kushman PC; David B. Kelley

(57) ABSTRACT

A fuel cell system having a fuel cell stack in a housing includes a compressor that provides compressed ambient air to the fuel cell stack and a ventilation system coupled to a suction side of the compressor to provide ventilation of the housing and cool an associated voltage monitoring unit that may be located within the housing or upstream of the housing. The ventilation system may control a valve to supply air from the compressor outlet to the housing to warm the housing and stack when either or both have a temperature below an associated threshold. The ventilation system may include a second valve to control exhaust from the housing based on the temperature of the housing or stack. Stack exhaust may drive a turbine coupled to the compressor. A heat exchanger may be positioned to cool compressed air from the compressor before flowing to the stack.

19 Claims, 6 Drawing Sheets

(51) Int. Cl.
*H01M 8/04119* (2016.01)
*H01M 8/04701* (2016.01)
*H01M 8/04858* (2016.01)
*H01M 8/2475* (2016.01)

(52) U.S. Cl.
CPC ..... *H01M 8/04716* (2013.01); *H01M 8/0488* (2013.01); *H01M 8/2475* (2013.01); *H01M 2250/20* (2013.01)

(58) Field of Classification Search
CPC ............. H01M 8/2475; H01M 8/0467; H01M 8/04119; H01M 8/04701; H01M 8/2483; H01M 8/2484; H01M 2250/20
See application file for complete search history.

(56) References Cited

U.S. PATENT DOCUMENTS

| | | | |
|---|---|---|---|
| 2008/0156549 A1 | 7/2008 | Leboe et al. | |
| 2009/0042082 A1 | 2/2009 | Townsend et al. | |
| 2017/0054162 A1* | 2/2017 | Rouveyre | H01M 4/0438 |

FOREIGN PATENT DOCUMENTS

| | | |
|---|---|---|
| DE | 112011103046 T5 | 7/2013 |
| JP | 2011014400 A | 1/2011 |

\* cited by examiner

FUEL CELL SYSTEM

CROSS-REFERENCE TO RELATED APPLICATIONS

This application claims foreign priority benefits under 35 U.S.C. § 119(a)-(d) to DE Application 10 2020 212 158.3 filed Sep. 28, 2020, which is hereby incorporated by reference in its entirety.

TECHNICAL FIELD

The present disclosure relates to ventilation and cooling of a fuel cell system for a motor vehicle.

BACKGROUND

Electric motors are increasingly being used in motor vehicles as a substitute for conventional internal combustion engines such as gasoline or diesel engines. As a source of energy for the electric motor in this context, it is possible to use not only rechargeable batteries but also fuel cells, in which the reaction energy of a fuel (e.g. hydrogen) and an oxidizing agent (e.g. oxygen) is converted into electrical energy. A common type of fuel cells are what are referred to as proton exchange membrane fuel cells or PEM fuel cells. In this case, the fuel cell has two chambers, which are separated by a membrane. Hydrogen is passed into one chamber, where it is split into electrons and protons at an anode, the protons being able to penetrate the membrane. The electrons are taken up by the anode and migrate to the cathode, which is arranged in the other chamber. This chamber is supplied with oxygen, which absorbs the electrons and combines them with the protons to form water molecules. Accordingly, water forms the only reaction product of the fuel cell.

Since the voltage of an individual fuel cell is only about 1.2 V and only a limited power can be achieved therewith, a plurality of fuel cells (e.g. several hundred or several thousand) is combined to form a stack for a motor vehicle drive. In this case, the anode of a cell can be connected to the cathode of the next cell by what is referred to as a bipolar plate. The oxygen for the cathode is made available by ambient air, and, for efficient operation of the fuel cells, it may be necessary to supply the ambient air at increased pressure. i.e. after compression by a compressor. This compressor may also be part of a turbocharger, whose turbine is driven by exhaust gases from the fuel cells, i.e. normally moist air at increased pressure and increased temperature.

The fuel cell stack is normally surrounded by a housing in the motor vehicle. Under certain circumstances, hydrogen may escape within the housing and form an uncontrolled reaction with oxygen or ambient air. For this reason, the housing must be ventilated, and a hydrogen sensor may be provided in order to detect leakage of hydrogen. A further possible reason for the ventilation is to maintain a temperature range which is suitable for the functionality of the fuel cells in the range between 20° C. and 80° C., for example. In addition, a cell voltage monitoring unit or CVM unit, monitors the cell voltage of the individual fuel cells (e.g. by making contact with the abovementioned bipolar plates) and can transmit corresponding information to a control unit. The CVM unit can, for example, trigger an alert or a shutdown if a significant change in the cell voltage distribution is measured or if the cell voltages are below a specific threshold value. The CVM unit is mounted on or in the housing and is cooled, e.g. by an airflow. In order to ensure the appropriate cooling and, in addition, to ensure the abovementioned ventilation of the housing, an electric fan is normally used, which is mounted on or in the housing. This takes up space, consumes energy during operation, and increases system complexity.

JP 2011-014400 A discloses an apparatus for monitoring the voltage of a fuel cell. This comprises a voltage monitoring part for monitoring the voltage of the fuel cell and a carrier element, on which the voltage monitoring part is installed. The carrier element is also used for cooling the voltage monitoring part. In this case, a cooling-water line can be passed through the carrier element. Instead of water cooling, oil or air cooling is also possible.

US 2008/0156549 A1 discloses a fuel cell system with a housing and a first subsystem arranged therein, which does not have approval for operation in a combustible environment. A sensor is arranged in the housing to detect a combustible gas. A component which can emit a combustible gas is arranged in the housing. A buoyancy path is defined within the housing in order to guide the combustible gas emitted in the housing by virtue of buoyancy in such a way that it can escape from the housing. The sensor is in the buoyancy path. In addition, an active ventilation system can be provided, wherein a ventilation duct is formed below a hydrogen tank and above the electrical components. Water cooling is provided for the actual fuel cell.

SUMMARY

It should be pointed out that the features and measures listed individually in the following description can be combined with one another in any technically expedient manner and show further embodiments of the claimed subject matter. The description additionally characterizes and gives details of the claimed subject matter in particular in association with the figures.

Embodiments according to the disclosure provide a fuel cell system. The fuel cell system may be used in both stationary and vehicle applications. In the latter case, vehicles my include aircraft, watercraft, and land vehicles, which may include motor vehicles such as passenger cars, buses, or trucks, although these representative motor vehicles are not intended to be limiting or restrictive.

The fuel cell system has a fuel cell stack which is arranged in a housing. The fuel cell stack has a plurality of fuel cells which are arranged in a stack-like manner and, in this arrangement, are connected at least partially or predominantly in series with one another. In the respective fuel cell, the reaction energy of a fuel and an oxidizing agent is converted into electrical energy. Although the claimed subject matter is not limited thereto, the fuel cells may be, in particular, proton exchange membrane fuel cells (or PEM fuel cells). Hydrogen is normally provided as the fuel, while oxygen is provided as the oxidizing agent. As will become clear below, the oxygen is provided by ambient air. The fuel cell stack is arranged in a housing whose function lies, inter alia, in mechanical protection of the fuel cell stack and encapsulation of the same, thereby enabling handling and installation to be made easier, for example. The housing is normally predominantly closed, but has connections for various lines.

The fuel cell system furthermore has a compressor which sucks in ambient air, compresses it and feeds it to the fuel cell stack via a first pressure line. In a known manner, the compressor has a suction side or inlet side as well as a pressure side or outlet side. The exact mode of operation of the compressor is not limited within the scope of the claimed subject matter. In all cases, it is set up to suck in ambient air on the suction side, to compress it and to discharge it on the pressure side and to feed it to the fuel cell stack via a first pressure line. Here and below, the term "line" is not to be interpreted as limiting, but refers to a device which is designed to receive and carry a gas. In this context, such a line may consist of several sections or parts, may have a non-constant cross section or may also have elements with which the quantity or composition of the gas flow can be influenced, such as, for example, valves or filters. The term "pressure line" refers to the pressure-side connection to the compressor and is otherwise not to be interpreted as restrictive. The first pressure line connects the compressor or its pressure side to the fuel cell stack. More precisely, it serves to supply the fuel cells with compressed air with the oxygen contained therein as an oxidizing agent. Within the fuel cells, this oxidizing agent reacts with a fuel, which as already mentioned above, is normally hydrogen. The compression of the sucked-in ambient air serves to produce in the region of the fuel cells an optimum oxygen concentration for the operation thereof.

Since the product of the reaction of hydrogen and oxygen is water, there is typically a high atmospheric humidity within the fuel cell stack. For the optimal functioning of the fuel cells, it is desirable to at least approximate or even match the air humidity of the compressed air to this. For this purpose, the first pressure line may include an air humidifier. The moisture for its operation can be extracted, for example, from an exhaust gas flow of the fuel cell stack.

In addition, the fuel cell system has a voltage monitoring unit, which is connected to the fuel cell stack. The voltage monitoring unit, which can also be referred to as a cell voltage monitoring unit or CVM unit, monitors the cell voltage of the individual fuel cells and can transmit corresponding information to a control unit. Under certain circumstances, it can output an alert signal or even initiate mitigating measures independently if the cell voltage is outside an intended range. To measure the cell voltage, at least contact lines of the voltage monitoring unit could run within the housing. Other parts of the voltage monitoring unit can be arranged outside the housing, but are generally arranged at least on the housing or adjacent thereto.

Furthermore, the fuel cell system has a ventilation system, which is designed to guide ambient air for heat exchange along the voltage monitoring unit and through the housing. Although "ambient air" is mentioned here, it is understood that the corresponding ambient air could be cleaned, filtered or otherwise modified prior to or within the ventilation system. In all cases, the ventilation system, which has one or more lines, is set up to guide the ambient air along the voltage monitoring unit, thereby enabling heat to be exchanged between the ambient air and the voltage monitoring unit. During this process, the voltage monitoring unit is normally cooled by the airflow which is guided past it. Furthermore, the ventilation system is designed to guide the ambient air through the housing. The latter performs two functions. On the one hand, the interior of the housing with the fuel cell stack located therein can be temperature-controlled (e.g. cooled). On the other hand, air exchange or gas exchange takes place within the housing. If, for example, hydrogen is released within the housing, this can be prevented from accumulating to such an extent that a mixture is formed that could result in an uncontrolled reaction. It is self-evident that, for the abovementioned purpose, the housing must have at least one inlet opening and one outlet opening, via which the ambient air can be led in and out again.

In various embodiments, a suction side of the compressor is connected at least indirectly to the ventilation system. It could also be stated that the ventilation system is connected at least indirectly to the suction side of the compressor. Thus, not only is ambient air sucked in from the outside by the compressor, but the airflow through the ventilation system is also generated by the compressor. That is to say, the compressor, which is in any case necessary for the optimum operation of the fuel cells, acquires a second function since it is also used for ventilating or cooling essential components of the fuel cell system. There is therefore no longer any need for a specially provided fan which would take up space and would complicate the construction of the fuel cell system. Thus, materials and energy consumption can be reduced and assembly simplified.

With respect to the ventilation system, the housing is advantageously arranged at least predominantly downstream of the voltage monitoring unit. In this case, the voltage monitoring unit can be arranged upstream of the (overall) housing. That is to say, the voltage monitoring unit and the housing are arranged in series with respect to the ventilation system, to be precise in such a way that the air is first guided along the voltage monitoring unit and exchanges heat with it (that is to say normally cools it), while it is then guided through the housing. Alternatively, the voltage monitoring unit can be arranged within the housing but in such a way that the predominant part of the housing is located downstream, with the result that the air within the housing is first guided along the voltage monitoring unit and then flows through the predominant part (or the remainder) of the housing. In each of the two alternatives mentioned, the voltage monitoring unit can be arranged, for example, in the vicinity of an inlet opening of the housing, through which the air enters the housing, either (directly) upstream or downstream of the inlet opening. By means of this design, the cooling of the voltage monitoring unit is generally optimized since the air is still essentially at ambient temperature when said unit is reached. Normally, the heating of the air which takes place during this process is not critical for the operation of the fuel cell stack. If, for example, instead the air were guided first through the interior of the housing, generally heating up during the process, and then along the voltage monitoring unit, the effective cooling of the latter could be impaired.

The compressor may be operated purely electrically with the aid of energy taken from the fuel cell stack. According to one embodiment, a turbocharger has the compressor and a turbine, which is connected to an exhaust gas line of the fuel cell stack. Normally, a rotor of the turbine and a rotor of the compressor are connected via a common shaft, with the result that their rotation is coupled to one another. An exhaust gas line coming from the fuel cell stack is connected to the turbine of the compressor or passed through it. In the case of a fuel cell which functions on the basis of hydrogen and oxygen, the exhaust gas which is carried in the exhaust gas line is essentially moist air. This ideally had an increased pressure and an increased temperature, enabling its increased internal energy to be used for operating the turbine. Under certain circumstances, the compressor may be operated exclusively by the turbine and thus by energy contained in the exhaust gas. In addition, however, it would also be possible for the action of the turbine to be supplemented by an electric auxiliary motor, for example. The turbocharger can also be designed as a bi-turbocharger with two compressors and two turbines. Irrespective of this, it is possible to use two compressors operating in parallel. Under certain circumstances, the compressor may also be designed as a two-stage compressor, resulting in two-stage compression of the ambient air. Even if, strictly speaking, one could refer to two compressors arranged in parallel or sequentially, these embodiments are also covered by the term "a compressor" in the context of the present disclosure.

The compressor sucks in the ambient air via a suction line, which is passed from a suitable point on the motor vehicle to the compressor, for example. Such a suction line can have an air filter, through % which solid particles and liquid droplets can be removed from the ambient air. The ventilation system could suck in the ambient air via a dedicated line that is independent of the suction line. However, in one embodiment, the ventilation system branches off from a suction line connected to the compressor on the suction side and opens into the suction line again in the region of a Venturi nozzle. In particular, the ventilation system can branch off from an air filter or downstream of an air filter. The part of the ventilation system which leads to the voltage monitoring unit and to the housing can be referred to as the supply air line, while the part which is arranged downstream of the voltage monitoring unit and of the housing can be referred to as the exhaust air line. A sensor, with which the composition of the airflow in the exhaust air line can be analyzed, may be arranged in the exhaust air line. In particular, this may be a hydrogen sensor, which can determine the hydrogen concentration to detect a possible leakage within the fuel cell stack. In the embodiment described here, the supply air line branches off from the suction line, while the exhaust air line opens into the suction line again, but in the region of a Venturi nozzle. Since the Venturi principle is based on a narrowing of the cross section, it can also be stated that the ventilation system (or the supply air line) branches off from a first region of the suction line with a wider cross section, while it (or the exhaust air line) opens into a second region with a narrower cross section. In the second region or in the region of the Venturi nozzle, there is an increased flow velocity in the suction line, resulting in a lower static pressure, as a result of which the air is sucked through the ventilation system.

In various embodiments, a first valve is arranged in an exhaust air line of the ventilation system downstream of the housing and of the voltage monitoring unit, said valve being designed to influence an airflow through the exhaust air line. The exhaust air line is part of the ventilation system and is arranged inside said ventilation system downstream of the housing and downstream of the voltage monitoring unit. That is to say, the air which flows through the exhaust air line has previously passed through the housing and the voltage monitoring unit or has flowed past the latter. The first valve can be designed as a passive valve or as an active valve which can be controlled, for example, by a control unit which will be explained below. It is designed to influence the airflow through the exhaust air line, which can mean that the airflow through the valve can be selectively blocked and released and/or that the intensity of the airflow can be changed. Particularly in the latter case, it is also possible to refer to a (first) throttle valve.

As a general rule, the ambient air which is fed to the housing by the ventilation system provides cooling of the housing. Depending on the ambient temperature and the current state of the fuel cell stack, however, such cooling may be counterproductive since too low a temperature likewise impairs the functioning of the fuel cells. This may be the case, for example, during a cold start of the motor vehicle. In principle, this could be countered by the airflow through the ventilation system being largely throttled or even completely blocked, for example by means of the abovementioned first valve. However, this would run counter to the ventilation function, that is to say the normally continuous exchange of air within the housing. In this case, hydrogen concentration may increase to undesirable levels. According to an advantageous development, the compressor is connected to the housing via a second pressure line, wherein a second valve is set up to influence the airflow through the second pressure line. The second pressure line is connected, on the one hand, directly or indirectly to the pressure side of the compressor and thus carries air which is under increased pressure and generally also has an increased temperature compared to the ambient air. On the other hand, the second pressure line opens into the housing. Overall, two air lines thus lead into the housing, namely a supply air line of the ventilation system and the second pressure line (which can also be regarded as part of the ventilation system). By means of the former, air that tends to be cooler can be fed to the housing, while air that tends to be warmer can be fed in via the latter. In all cases, the air can leave the housing again through the abovementioned exhaust air line. The warmer air from the second pressure line makes it possible to ventilate the housing without having to accept undercooling of the fuel cell stack, which would impair its functioning. Since, as mentioned above, the necessity to supply warmer air depends on the operating state of the fuel cell stack on the one hand and on the temperature of the ambient air on the other hand, a second valve is provided to influence the airflow through the second pressure line. As already explained above with respect to the first valve, this can relate to selective blocking and release of the airflow and/or to a change in the intensity of the latter.

Under certain circumstances, it may be expedient for the first pressure line to have a heat exchanger and for the second pressure line to bypass the heat exchanger. The heat exchanger serves to cool the air heated in the compressor before it is fed to the fuel cell stack. If present, an abovementioned air humidifier is preferably arranged downstream of such a heat exchanger. However, cooling the air in the second pressure line would normally be counterproductive, for which reason it bypasses the heat exchanger. In this case, it can branch off from the first pressure line upstream of the heat exchanger or else be routed completely independently of the latter.

The ventilation system can have a supply air line upstream of the housing and of the voltage monitoring unit, wherein a third valve is set up to influence the airflow through the supply air line. Via the supply air line, the ambient air is fed to the housing and to the voltage monitoring unit. As already explained, this ambient air is generally cooler than the air carried in the second pressure line. Particularly when cooling of the housing is not necessary or even counterproductive, the airflow through the supply air line can be reduced or even completely interrupted by the third valve, while it can be increased or maximized when cooling is necessary. This embodiment can advantageously be combined with the abovementioned one, in which a second pressure line with a second valve is provided.

A control unit determines at least indirectly a temperature inside the housing and controls the second and the third valve in accordance therewith in order to influence the airflows through the supply air line and through the second pressure line. The control unit can be considered to be part of the fuel cell system. However, it can additionally also be designed as it were as a higher-level control unit for control functions which do not relate to the fuel cell system. It is self-evident that the control unit can be implemented at least partially in the form of software. The control unit may be connected to at least one temperature sensor arranged on or within the housing. For example, a temperature sensor can be arranged in the region of an inlet opening of the housing, in which the air originating from the supply air line and/or from the second pressure line flows into the housing. Alternatively or additionally, a temperature sensor can be arranged in the region of an outlet opening of the housing, in which the air flows out into the exhaust air line. In addition, the control unit can be set up to determine at least indirectly a temperature inside the supply air line and/or the second pressure line. For this purpose, it can be connected to further temperature sensors, which can be arranged in the supply air line and/or in the second pressure line, for example. By means of the measured values obtained, the control unit can, for example, determine an optimum mixing ratio of the airflows from the supply air line and the second pressure line and set it accordingly by means of the second and the third valve.

Under certain circumstances, the cooling of the voltage monitoring unit by the ventilation system may be inadequate. This may be the case, for example, if the voltage monitoring unit converts a particularly large amount of electrical power into heat during operation, if the ambient temperature—and thus the temperature of the ambient air—is unusually high, or if the supply of ambient air via the ventilation system is periodically throttled in order to prevent undercooling of the fuel cell stack. In these cases, the fuel cell system can have a cooling unit, which is independent of the ventilation system, for cooling the voltage monitoring unit. The corresponding cooling unit can have, for example, a separate cooling circuit with a first heat exchanger on the voltage monitoring unit and a second heat exchanger for discharging heat to the environment. Within a motor vehicle, further vehicle components could also be integrated into this cooling circuit. Alternatively, the cooling unit could also have one or more Peltier elements, for example.

Further advantageous details and effects of the claimed subject matter are explained in detail below by means of representative embodiments illustrated in the figures.

DETAILED DESCRIPTION

Embodiments of the present disclosure are described below. However, it should be understood that the disclosed embodiments are only examples, and other embodiments may take various alternative forms. Drawings are not necessarily drawn to scale; and some functions may be exaggerated or minimized to show details of specific components. Therefore, the specific structural and functional details disclosed herein should not be interpreted as restrictive, but merely as a representative basis for teaching those skilled in the art to use the claimed subject matter in various ways. As will be understood by those of ordinary skill in the art, various features shown and described with reference to any one of the drawings may be combined with features shown in one or more other drawings to produce embodiments which may not be explicitly shown or described. The combination of the features shown provides representative embodiments for a typical application. However, various other combinations and modifications of features consistent with the teachings of the present disclosure may be expected for certain specific applications or embodiments.

In the various figures, similar parts are provided with the same reference signs, and for this reason such parts are generally also described only once.

Figure 1:
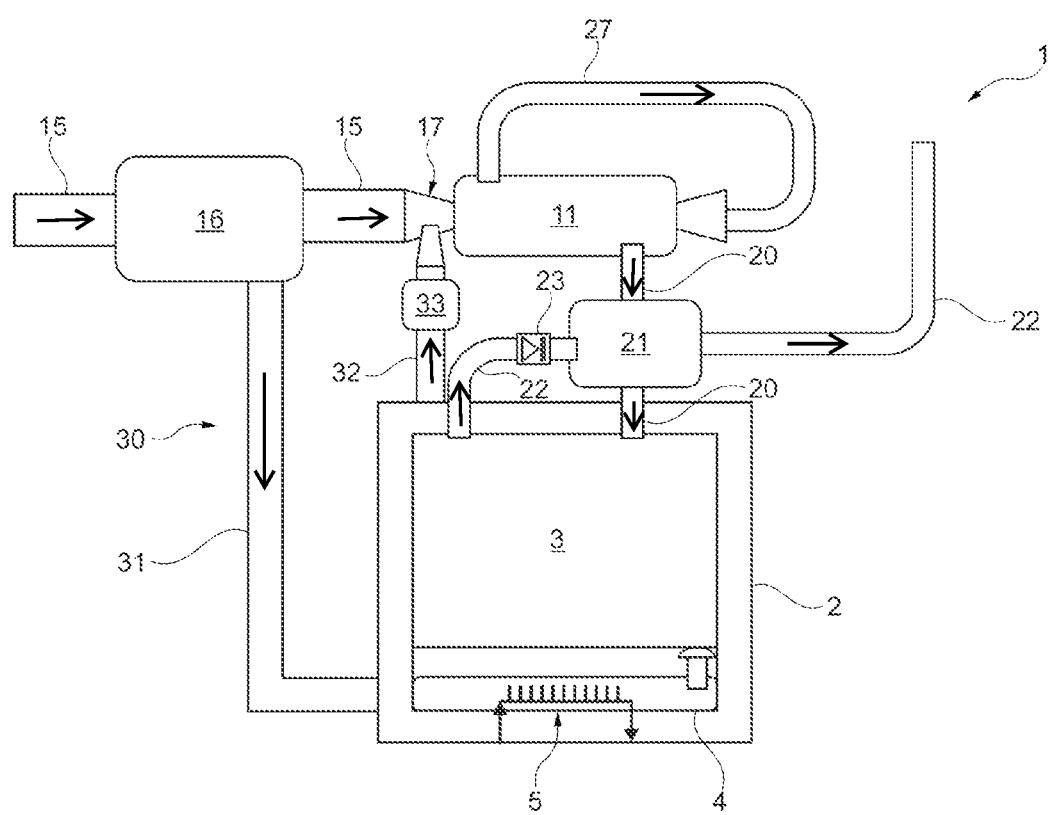
FIG. 1 is a schematic illustration of a representative fuel system according to the disclosure.

FIG. 1 shows a representative fuel cell system 1 according to the disclosure, which can be used, for example, in a motor vehicle such as a truck or passenger car. A fuel cell stack 3 is arranged in a housing 2. It can have, for example, several hundred or several thousand PEM fuel cells, which are designed for the conversion of hydrogen and oxygen to water. In order to monitor the cell voltages, a voltage monitoring unit 4, which can also be referred to as CVM unit, is arranged in the housing 2. It makes contact with the individual fuel cells via connecting lines, not shown here, in order to measure their voltage. If a deviation of the cell voltages from an intended setpoint range is detected, the voltage monitoring unit 4 can generate an indication or alert signal, which is sent, for example, to a higher-level vehicle controller. While the hydrogen is taken from a tank (not illustrated here) of the motor vehicle, the oxygen is obtained from the ambient air. This is sucked in by a two-stage compressor 11 via an intake line 15, compressed in a first stage, fed to a second stage via an auxiliary line 27, compressed again and fed to the fuel cell stack 3 via a first pressure line 20. In order to match the air humidity of the air compressed in this way to the conditions within the fuel cell stack 3, the first pressure line 20 has an air humidifier 21. The latter enriches the air in the first pressure line 20 with moisture, which is taken from the air carried in an exhaust gas line 22. The exhaust gas line 22, which has a check valve 23, is connected to the fuel cell stack 3 and carries away air from the individual fuel cells, which is enriched by the reaction of hydrogen and oxygen with water.

In order, on the one hand, to ensure cooling of the fuel cell stack 3 and of the voltage monitoring unit 4 and, on the other hand, to ventilate the interior of the housing 2, a ventilation system 30 is provided. This has a supply air line 31, which branches off from an air filter 16 of the suction line 15 and leads to the voltage monitoring unit 4. The ventilation system 30 leads into the housing 2 in the vicinity of the voltage monitoring unit 4. Within the housing 2, the air first reaches the voltage monitoring unit 4, and therefore the housing is located predominantly downstream of the voltage monitoring unit 4. In this case, the interior of the housing 2 forms part of the ventilation system 30, which furthermore has an exhaust air line 32, which is routed from the housing 2 to a Venturi nozzle 17 within the intake line 15. The Venturi nozzle 17 can also be considered to be a section of the intake line 15 with a narrowed cross section. Owing to the higher flow velocity in this constricted section, the static pressure within the suction line 15 is lower here than, for example, at the air filter 16, for which reason, overall, ambient air is sucked through the ventilation system 30 by the action of the compressor 11. Thus, no additional fan is necessary; instead, use is made of a component which is present in any case for the purpose of generating the compressed air for the fuel cell stack 3. The ventilation of the housing 2 prevents the formation of a mixture that could react in an uncontrolled manner in the event of an escape of hydrogen. In addition, the presence or extent of such a hydrogen leakage can be determined by analysis of the airflow carried in the exhaust air line 32. For this purpose, the exhaust air line 32 has a hydrogen sensor 33.

The fuel cell system 1 can optionally have a cooling unit 5, by means of which the voltage monitoring unit 4 can be cooled independently of the ventilation system 30. This can be designed, for example, as a heat exchanger which is connected to a liquid cooling circuit.

Figure 2:
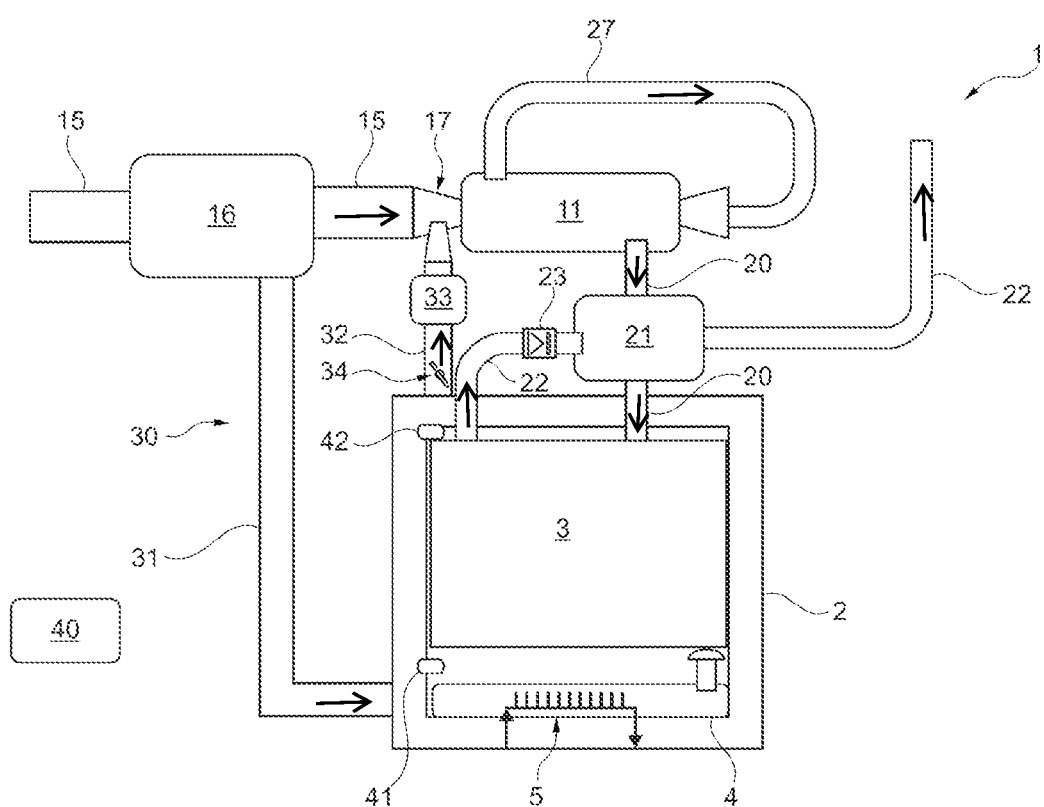
FIG. 2 is a schematic illustration of the fuel system of FIG. 1 showing positioning and operation of at least one electronically controlled valve to further control the ventilation according to the disclosure.

FIG. 2 shows a fuel cell system 1 according to the disclosure, which is largely identical to the system of FIG. 1 and to this extent will not be explained again. However, in this case, a first valve 34 is arranged in the exhaust air line 32, by means of which valve the airflow through the exhaust air line 32 and thus the airflow through the entire ventilation system 30 can be influenced. The airflow can be throttled or even stopped completely, for example if the temperature inside the housing 2 is so low that the functioning of the fuel cells could be impaired. For this reason, the first valve 32 is normally designed as an active valve which is controlled by a control unit 40. The control unit 40 can be connected to temperature sensors 41-42 in order to determine whether corresponding throttling of the airflow is necessary. In this example, a first temperature sensor 41 is arranged within the housing 2 in the vicinity of an inlet opening, through which the air enters the housing 2 in the region of the voltage monitoring unit 4, while a second temperature sensor 42 is arranged in the vicinity of an outlet opening, at which the air enters the exhaust air line 32 from the housing. This configuration is, of course, to be understood only by way of example and one of said sensors 41, 42 could be omitted or placed differently. In addition, further temperature sensors 43, 44 (See FIG. 3, for example) could be provided.

Figure 3:
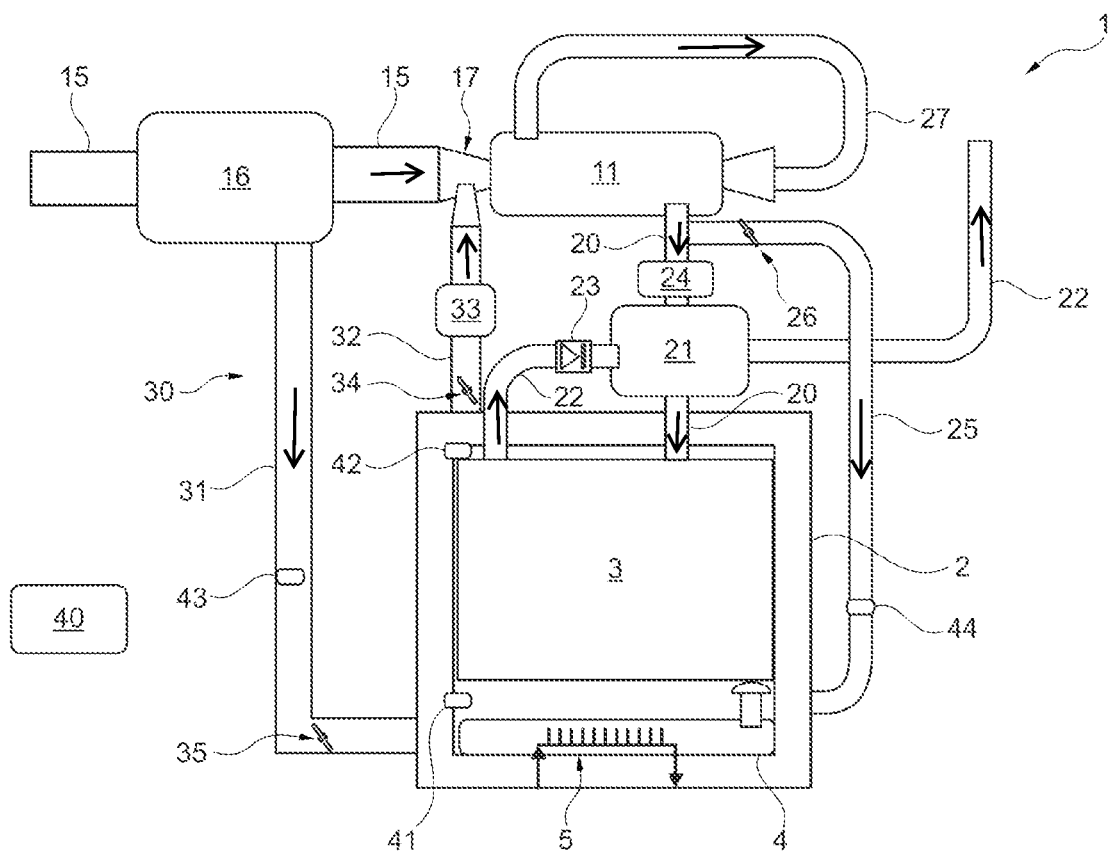
FIG. 3 is a schematic illustration of the system of FIG. 1 or 2 showing placement and operation of additional electronically controlled valves, temperature sensors, and compressed air heat exchanger according to the disclosure.

FIG. 3 shows a fuel cell system 1, which once again is largely identical to the system illustrated in FIGS. 1 and 2 and to this extent will not be explained again. In this case, however, a heat exchanger 24 is provided in the first pressure line 20 upstream of the air humidifier 21, by means of which heat exchanger the air carried in the first pressure line 20 is cooled before it reaches the air humidifier 21 and subsequently the fuel cell stack 3. A second pressure line 25 branches off from the first pressure line 20 and, like the supply air line 31, opens into the interior of the housing 2. However, while the air carried in the supply air line 31 is initially at ambient temperature and is normally only slightly heated by passing through the voltage monitoring unit 4, the air in the second pressure line 25 may be at a significantly higher temperature owing to the energy input by the compressor 11. The second pressure line 25 has a second valve 26 and the supply air line 31 has a third valve 35, both of which are controlled by means of the control unit 40. The control unit 40 can thus selectively interrupt the airflow in each of the two lines 25, 31 or also vary its intensity. While all the air which is passed through the housing 2 always leaves the housing through the exhaust air line 32, the proportion of (generally cooler) air from the supply air line 31 and (generally warmer) air from the second pressure line 25 can be varied by adjusting the second valve 26 and the third valve 35. In order to be able to better determine the corresponding proportions, the control unit 40 is in this case connected to a third temperature sensor 43 in the supply air line 31 and to a fourth temperature sensor 44 in the second pressure line 25.

Figure 4:
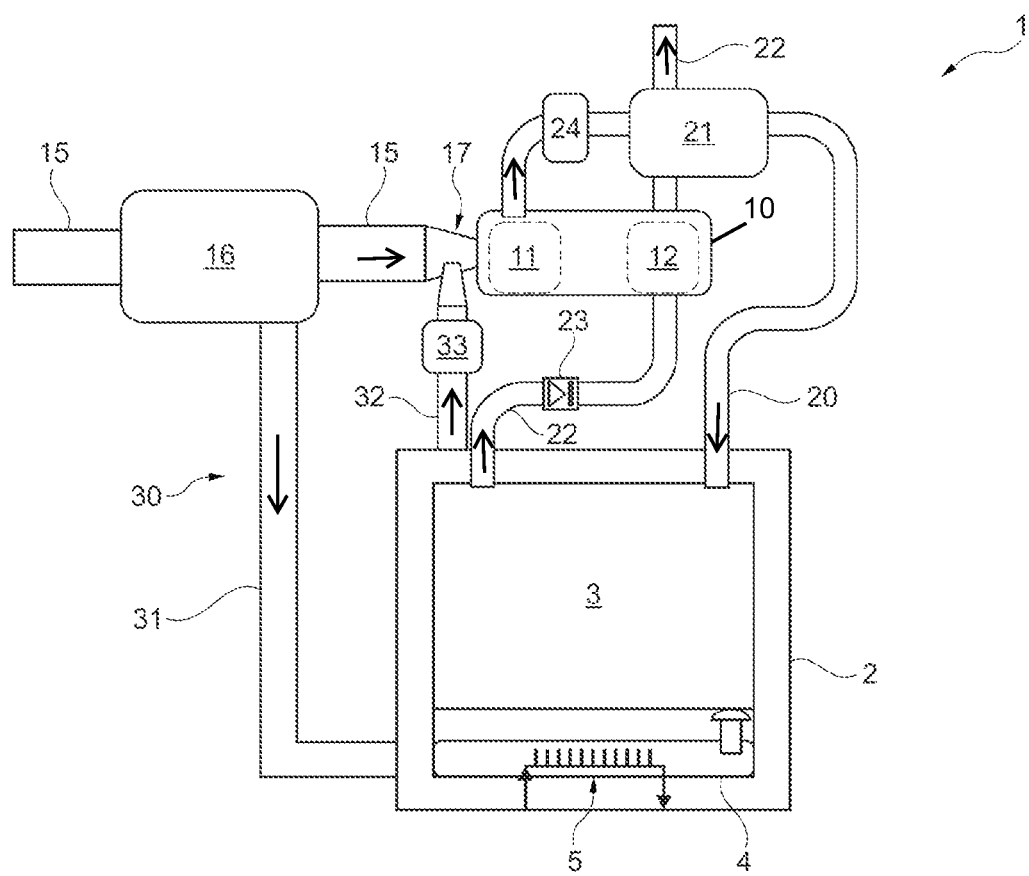
FIG. 4 is a schematic illustration of the system of FIGS. 1-3 having a turbocharger or exhaust-driven turbine coupled to a compressor according to the disclosure.

FIG. 4 shows a fuel cell system 1, which is largely identical to the system illustrated in FIG. 1 and to this extent will not be explained again. However, in this case, the compressor 11 is coupled to, and driven by, an exhaust turbine 12. Compressor 11 and turbine 12 may be integrated within a common housing as a turbocharger 10, which has a turbine 12 that can be connected via a common shaft to the compressor 11. The exhaust gas line 22 is passed through the turbine 12, thus enabling the exhaust air coming from the fuel cell stack 3 to be used to drive the turbine 12. Subsequently, the exhaust gas line 22 passes through the air humidifier 21. The first pressure line 20 may pass first through a heat exchanger 24 and then through the air humidifier 21 (as in the embodiment shown in FIG. 3), and from there is guided further to the fuel cell stack 3. Under certain circumstances, the pressure of the exhaust air may be inadequate for efficient operation of the turbine 12. In this case, the turbocharger 10 can have an electric motor (not illustrated here) as an auxiliary drive.

Figure 5:
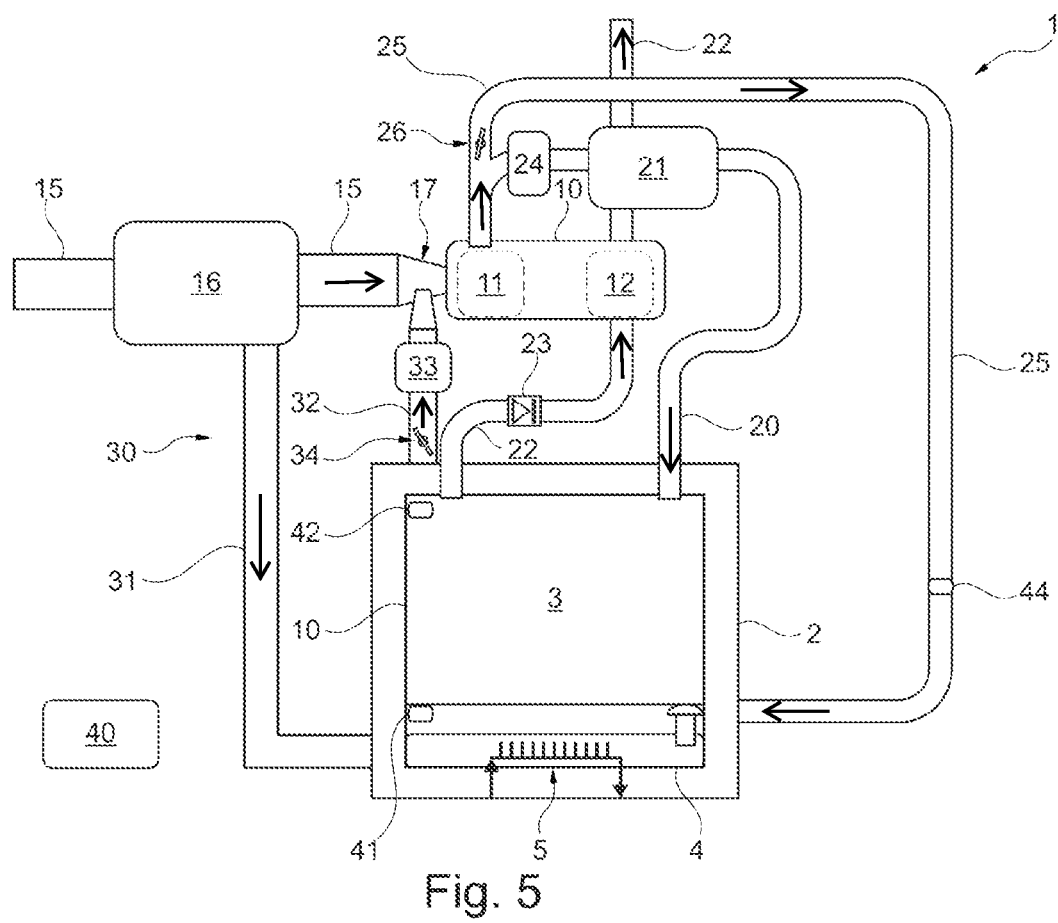
FIG. 5 is a schematic illustration of the system of FIG. 3 with a turbocharger similar to the system of FIG. 4 according to the disclosure.

FIG. 5 shows a fuel cell system 1, which is largely identical to the embodiment illustrated in FIG. 3 and to this extent will not be explained again. Here too, however, the compressor 11 is part of a turbocharger 10, which has a turbine 12. The exhaust gas line 22 is once again passed through the turbine 12 in order to drive the turbine 12, as well as through the air humidifier 21. Furthermore, the first pressure line 20 passes first through the heat exchanger 24 and then through the air humidifier 21, and from there is guided further to the fuel cell stack 3. Once again, the turbocharger 10 can have an electric motor (not illustrated here) as an auxiliary drive.

In the representative embodiments shown here, the voltage monitoring unit 4 is arranged inside the housing 2. Alternatively, however, it would also be possible, for example, for it to be arranged outside the housing 2, upstream thereof. In this case, the entire housing 2 would be arranged downstream of the voltage monitoring unit 4.

Figure 6:
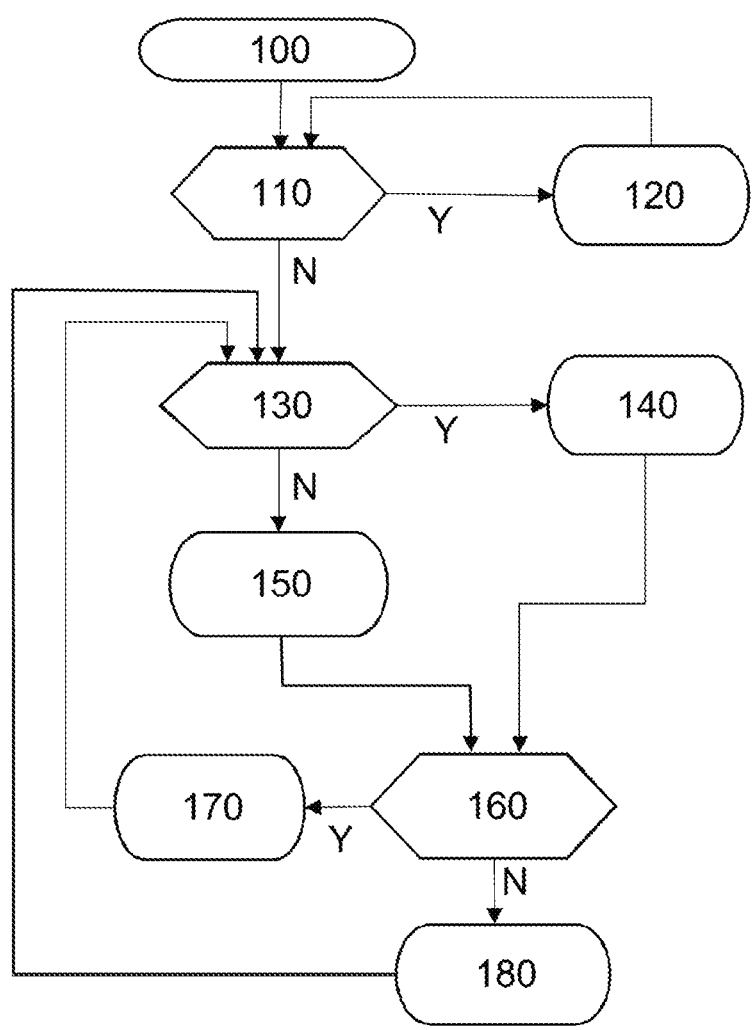
FIG. 6 is a flow chart illustrating operation of a representative fuel cell system according to the disclosure.

FIG. 6 is a flow chart schematically illustrating a possible operating method of the fuel cell system 1. After the start in step 100, it is first checked in step 110 whether cold start conditions are present. e.g. shortly after the starting of the vehicle at low ambient temperature. In this case, the temperature of the fuel cell stack 3 is so low that the optimal functioning of the fuel cells is impaired. Whether this is the case can be determined, for example, on the basis of the measured values from the first and/or second temperature sensor 41, 42. If the control unit 40 decides that cold start conditions are present, it opens the second pressure line 25 by means of the second valve 26 and closes the supply air line 31 by means of the third valve 35 in step 120. This accelerates the heating process of the fuel cell stack 3, while the passage of air through the housing 2 continues, thus enabling a hydrogen concentration to be determined via the hydrogen sensor 33, for example.

If it is determined during a renewed check of the cold start conditions that these are no longer present, normal operation is to a certain extent achieved by checking in step 130 whether cooling of the housing 2 (or of the fuel cell stack 3 accommodated therein) and of the voltage monitoring unit 4 is necessary. If this is the case, the second pressure line 25 is closed in step 140, while the supply air line 31 is opened. Thus leads to a maximum possible cooling effect. If no cooling of the housing 2 is necessary, an attempt is made to maintain its current operating temperature at least approximately. For this purpose, the control unit 40 opens the second pressure line 25 and the supply air line 31 in each case proportionally in step 150, it being possible to determine the proportion, inter alia, on the basis of the measured values from the third temperature sensor 33 and from the fourth temperature sensor 34. In each case, a check is made in an additional step 160 to determine whether additional cooling of the voltage monitoring unit 4 is necessary. If so, the cooling unit 5 is switched on in step 170; otherwise it is switched off in step 180.

Although representative embodiments are described above, it is not meant that these embodiments describe all possible forms covered by the claims. The words used in the specification are descriptive words rather than restrictive words, and it should be understood that various changes can be made without departing from the claimed subject matter. As mentioned above, the features of the various embodiments can be combined to form further embodiments of the present disclosure that may not be explicitly described or illustrated. Although various embodiments can be described as providing advantages or advantages over other embodiments or prior art implementations in terms of one or more desired characteristics, those of ordinary skill in the art recognize that, depending on specific applications and implementations, one or more features or characteristics can be compromised to achieve the desired overall system properties. These attributes comprise but are not limited to, strength, durability, life cycle, marketability, appearance, packaging, size, maintainability, weight, manufacturability, ease of assembly, etc. Therefore, embodiments described as less desirable than other embodiments or prior art implementations in one or more characteristics are outside the scope of the present disclosure and may be expected for specific applications.

What is claimed is:

1. A fuel cell system comprising:
a fuel cell stack having a plurality of fuel cells, the fuel cell stack contained within a housing;
a compressor having an inlet coupled to ambient and an outlet coupled to the fuel cell stack;
a voltage monitor configured to monitor voltage of the plurality of fuel cells;
a ventilation system including a first duct coupling the inlet of the compressor to an inlet of the housing, the first duct having a first electronically controllable valve; and
a controller programmed to control the first electronically controllable valve in response to temperature of at least one of the fuel cell stack and the housing.

2. The system of claim 1 wherein the voltage monitor is disposed within the housing.

3. The system of claim 1 further comprising a turbine mounted on a common axis with the compressor, and an exhaust duct coupling the fuel cell stack to the turbine.

4. The system of claim 1 further comprising an exhaust duct coupled to the housing and the inlet of the compressor.

5. The system of claim 4 further comprising an electronically controlled valve positioned within the exhaust duct.

6. The system of claim 4 further comprising a hydrogen sensor coupled to the exhaust duct.

7. The system of claim 6 further comprising:
a humidifier coupled to the outlet of the compressor and an inlet of the fuel cell stack; and
a fuel cell stack exhaust duct coupled to the fuel cell stack and the humidifier.

8. The system of claim 7 further comprising a heat exchanger having an inlet coupled to the outlet of the compressor and an outlet coupled to the humidifier.

9. The system of claim 8 further comprising:
a bypass duct coupled to the outlet of the compressor and an inlet of the housing; and
an electronically controlled valve disposed within the bypass duct.

10. A method for controlling a fuel cell system, comprising, by a controller:
controlling a first valve within a duct coupling a compressor inlet to a first inlet of a housing containing a fuel cell stack and a fuel cell voltage monitor, a second valve within an exhaust duct between an outlet of the housing and the compressor inlet, and a third valve within a bypass duct coupling a compressor outlet to a second inlet of the housing in response to temperature of at least one of the fuel cell stack and the housing.

11. The method of claim 10 wherein controlling the first, second, and third valves comprises at least partially closing the second valve and at least partially opening the third valve in response to the temperature being below an associated threshold.

12. The method of claim 11 wherein controlling the first, second, and third valves further comprises at least partially closing the first valve in response to the temperature being below the associated threshold.

13. The method of claim 12 further comprising monitoring a signal from a hydrogen sensor disposed in the exhaust duct and generating an alert signal in response to the signal from the hydrogen sensor detecting hydrogen exceeding a corresponding threshold.

14. A vehicle system comprising:
a fuel cell stack having a plurality of fuel cells contained within a housing;
a fuel cell voltage monitor contained within the housing;
a compressor having an ambient air inlet and an outlet; and
a ventilation system comprising:
a first duct coupling the ambient air inlet of the compressor to a first inlet of the housing;
a second duct coupling the outlet of the compressor to a second inlet of the housing;
a third duct coupling an outlet of the housing to the ambient air inlet of the compressor; and
an electronically controllable valve in each of the first, second, and third ducts.

15. The vehicle system of claim 14 further comprising a humidifier having a first inlet coupled to the outlet of the compressor, a first output coupled to an input of the fuel cell stack, a second input coupled to an outlet of the fuel cell stack, and a second outlet coupled to ambient, the humidifier configured to transfer moisture from air exhausted from the fuel cell stack to compressed air from the outlet of the compressor.

16. The vehicle system of claim 15 further comprising a heat exchanger coupled to the outlet of the compressor upstream of the humidifier.

17. The vehicle system of claim 16 further comprising a hydrogen sensor coupled to the third duct.

18. The vehicle system of claim 16 further comprising a check valve disposed between the outlet of the fuel cell stack and the second input of the humidifier.

19. The vehicle system of claim 15 further comprising a controller programmed to control the electronically controllable valves in response to temperature of at least one of the housing and the fuel cell stack.

* * * * *